March 24, 1931. H. A. PALMER 1,798,104
POWER TRANSMITTING MECHANISM
Filed Oct. 7, 1927
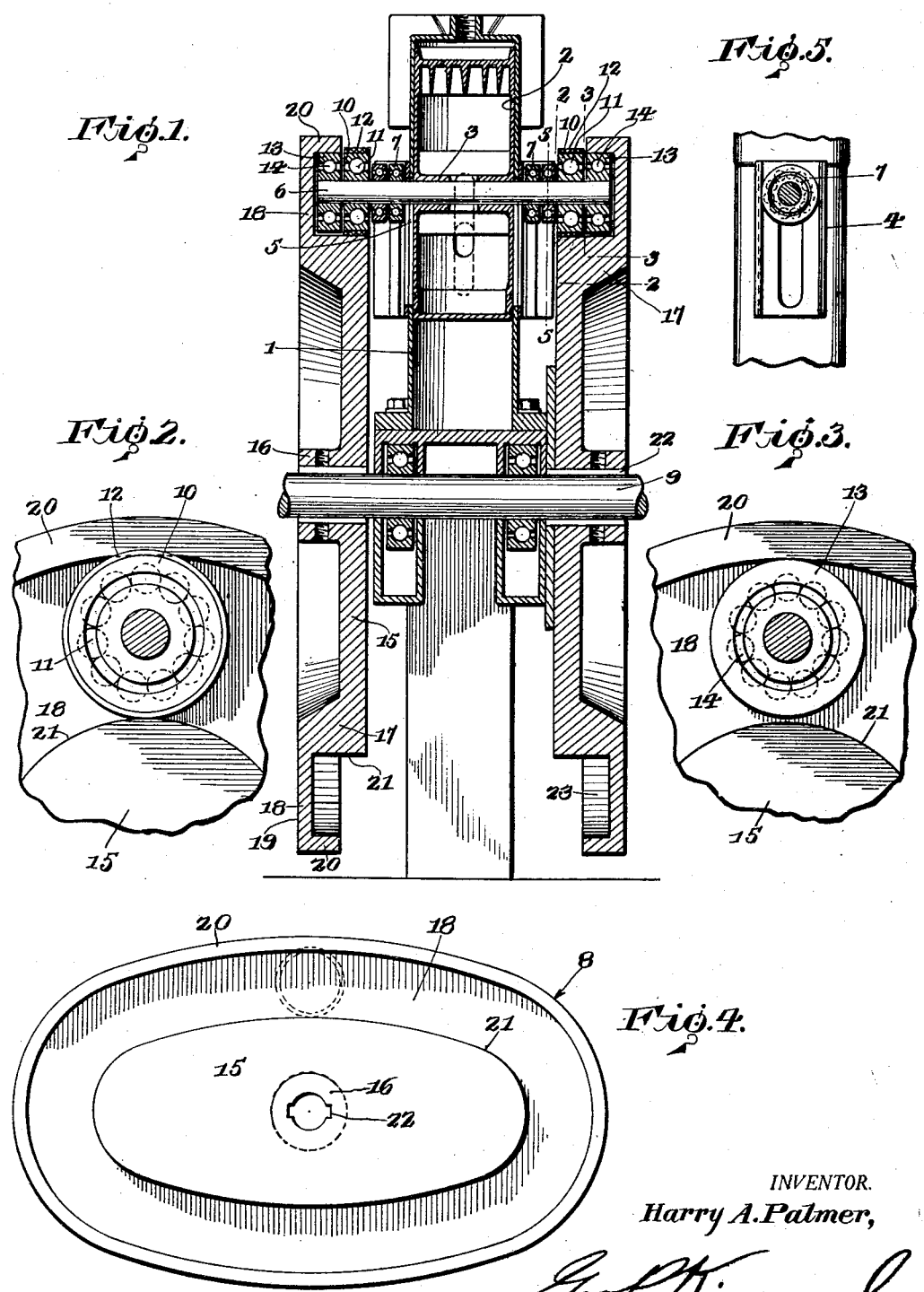
INVENTOR.
Harry A. Palmer,
ATTORNEY.

Patented Mar. 24, 1931

1,798,104

UNITED STATES PATENT OFFICE

HARRY A. PALMER, OF DORCHESTER, MASSACHUSETTS, ASSIGNOR TO PALMER INVENTIONS, INC., OF BOSTON, MASSACHUSETTS, A CORPORATION OF MASSACHUSETTS

POWER-TRANSMITTING MECHANISM

Application filed October 7, 1927. Serial No. 224,672.

This invention relates to a power transmitting mechanism and is designed primarily for use in connection with internal combustion engines, but it is to be understood that a power transmitting mechanism, in accordance with this invention, can be used in connection with any type of engine for which it is found applicable, and the invention has for its object to provide, in a manner as hereinafter set forth, a power transmitting mechanism for converting a reciprocatory motion into a rotary one and whereby continuous power is had by obtaining a lower speed drive from a high speed piston displacement.

Further objects of the invention are to provide, in a manner as hereinafter set forth, a power transmitting mechanism which is comparatively simple in its construction and arrangement, strong, durable, thoroughly efficient in its use, readily assembled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a vertical, sectional view of an internal combustion engine, showing the adaptation therewith of a power transmitting mechanism in accordance with this invention.

Figure 2 is a fragmentary sectional view taken on line 2—2 Figure 1.

Figure 3 is a view similar to Figure 2 taken on line 3—3 Figure 1.

Figure 4 is a rear elevation of a shaft impeller.

Figure 5 is a section on line 5—5 Figure 1.

A power transmitting mechanism, in accordance with this invention, is shown by way of example, as set up in connection with an internal combustion engine of a construction similar to that disclosed in my application Serial Number 182,806, filed April 11, 1926, and such engine includes a cylinder 1, a balanced piston 2 operating in the cylinder 1 and closed at each end and the piston 2 has means as at 3 for connecting therewith a wrist pin to be presently referred to. The cylinder 1, has each side provided with opposed guides 4 and said cylinder 1 is also provided with lengthwise extending slots for the passage of the wrist pin to be presently referred to. It is thought unnecessary to specifically describe the construction of the engine, as disclosed in the aforesaid application, other than what has been referred to, as no claim is made herein to the engine construction other than that it is illustrated to show the piston thereof as operating a bodily reciprocating wrist pin 6 which forms an element of the power transmitting mechanism in accordance with this invention.

A power transmitting mechanism, in accordance with this invention, includes the wrist pin 6 which is of a length to project a substantial distance from each side of the cylinder 1. The wrist pin 6 in proximity to the sides of the cylinder 1, carries pairs of anti-friction roller devices 7 which travel against the guides 4 when the wrist pin 6 is reciprocated with the piston 2.

The wrist pin 6, as before stated, is bodily carried by the piston 2, during the reciprocations thereof, and the power transmitting mechanism is so set up as to convert the reciprocatory movement of the piston into a rotating one for a pair of shaft impellers 8 which are keyed to a shaft 9 for the purpose of driving the latter. The shaft impellers 8 will be hereinafter more specifically referred to.

The reference character 10 indicates a pair of driving rollers and interposed between said rollers 10 and the wrist pin 6 are roller bearing devices 11. Each driving roller 10 is provided with a soft metal band 12 and which acts as a protecting means to prevent the drive roller from breaking. The drive rollers 10 are positioned on and adjacent the outer ends of the wrist pin 6. Mounted on each end of the wrist pin 6, outwardly with respect to a driving roller 10, is a pull down roller 13 and interposed therebetween and the shaft 6 is a roller bearing device 14.

The shaft impellers 8 are oppositely disposed with respect to each other and each of said impellers is of oval contour and consists of a web 15, a hub 16, a rim 17 and an extension 18 co-extensive with the rim 17. The extension 18 in cross section is formed of two parts 19, 20 disposed at right angles with respect to each other. In cross section the part 20 is of less length than the part 19. The part 20 extends inwardly at right angles from the outer end of the part 19. The part 20 of the extension 18 overhangs the edge of the rim 17 at the outer portion thereof. The part 19 of the extension 18 is integral with the outer marginal part of the edge of the rim 17. In cross section the rim 17 has that part of its outer edge which projects inwardly from the inner end of the part 19 extending in the same plane throughout. The web 15 is of less thickness than the rim 17 and the latter projects laterally from the outer portion of the web. The extension 18 is of less thickness than the thickness of the rim 17 and the outer face of the portion 19 of the extension 18 is flush with the outer side of the rim 17. The hub 16 projects outwardly from the web 15 and its cross sectional length is greater than the thickness of the web 15. The outer edge of the rim 17 and which is indicated at 21 provides a track for a driving roller 10. The cross sectional length of the portion 20 of the extension 18 is less than the cross sectional length of the rim 17. Preferably the cross sectional length of the portion 20 of the extension 18 is about half the cross sectional length of the rim 17 at the outer edge thereof. The edge 21 of the rim 17 is of greater width than the width of a driving roller 10. The hubs 16 of the impellers 8 are keyed to the shaft 9 as at 22.

The driving rollers 10 travel on the edge 21 of the impellers 8 and the pull down rollers 13 travel in the grooves 23 formed between an outer edge of an impeller and the inner face of the portion 20 of the extension 18. The pull down rollers 13 bear against the outer wall of the guide grooves and such outer wall is formed by the inner face of the overhanging portion 20 of the extension 18. The pull down rollers do not ride against the edges or rather outer edges of the impellers 8. The pull down rollers provide for a continuous contact between the driving rollers and the edges of the impellers. The anti-friction roller devices, carried by the wrist pin 6, guide the same when it is bodily shifted by the piston during the reciprocation of the latter and said devices coact with the guides to prevent twisting or wobbling of the piston and further maintain it balanced. The drive rollers are of greater diameter than the diameter of the pull down rollers.

The setting up of the drive and pulling or holding down rollers with bearings reduces friction to a minimum and prevents overheating.

During the reciprocation of the piston the driving rollers having rolling contact with the edges of the impeller will rotate the same thereby carrying the shaft 9 therewith and by this operation the reciprocatory motion of the piston is converted into a rotary motion for the shaft 9. The shape of the impellers are such as to not interfere with the reciprocations of the piston. The said impellers will be carried around due to the rolling contact of the driving rollers therewith when the wrist pin is reciprocated by the piston.

It is thought the many advantages of a power transmitting mechanism, in accordance with this invention, can be readily understood, and although the preferred embodiment of the invention is as illustrated and described, yet it is to be understood that changes in the details of construction can be had which fall within the scope of the invention as claimed.

What I claim is:

1. A power transmitting means comprising the combination with the piston and cylinder of an internal combustion motor, said cylinder having diametrically disposed, lengthwise extending slots, of a pair of oppositely disposed endless impellers, each having a portion thereof permanently opposing a slot in the cylinder and arranged in spaced relation with respect to the latter, a wrist pin secured to the piston at the transverse median thereof and projecting beyond the wall of the cylinder through the slots of the latter, roller means on each end of the wrist pin, each roller means having rolling contact with an impeller for driving it on the reciprocation of the piston, said cylinder and wrist pin having means to prevent the twisting of the pin during the reciprocation of the piston.

2. A power transmitting means comprising the combination of a cylinder of an internal combustion motor, said cylinder having its body formed with diametrically disposed, lengthwise extending slots, a piston reciprocating in said cylinder, a pair of oppositely disposed, endless impellers, each having a portion thereof permanently opposing and spaced from a slot of the cylinder, a wrist pin secured to the piston at the transverse median thereof and projecting beyond the cylinder through the slots of the latter, a pair of roller elements mounted on each end of the wrist pin, spaced from the cylinder and each pair having rolling contact simultaneously with an impeller for driving it on the reciprocation of the piston, revoluble bearing elements interposed between the cylinder body and the driving means for the impellers and mounted on the wrist pin, and means projecting laterally from the cylinder and coacting with said bearing elements to prevent twisting of the pin during the reciprocatory movement of the piston.

In testimony whereof, I affix my signature hereto.

HARRY A. PALMER.